United States Patent [19]

Naito et al.

[11] 4,025,836

[45] May 24, 1977

[54] PROTECTIVE SYSTEM AGAINST COMMUTATION FAILURE IN A CHOPPER CIRCUIT

[75] Inventors: Shotaro Naito, Katsuta; Hirosi Katada, Naka, both of Japan

[73] Assignee: Hitachi, Ltd., Japan

[22] Filed: July 3, 1975

[21] Appl. No.: 592,876

[30] Foreign Application Priority Data

July 5, 1974 Japan .............. 49-76304

[52] U.S. Cl. .................. 318/490; 318/565; 318/139

[51] Int. Cl.² .................. H02P 7/12

[58] Field of Search .......... 318/139, 565, 563, 490; 328/158 MG

[56] References Cited

UNITED STATES PATENTS

| | | | |
|---|---|---|---|
| 3,166,691 | 1/1965 | McGee | 318/563 |
| 3,588,658 | 6/1971 | Sluys et al. | 318/565 |
| 3,601,700 | 8/1971 | Collett et al. | 318/565 X |
| 3,755,724 | 8/1973 | Anderson | 318/139 |
| 3,818,291 | 6/1974 | Miyake | 318/139 |
| 3,902,105 | 8/1975 | Delaney et al. | 318/139 X |
| 3,914,675 | 10/1975 | Konrad | 318/139 X |

*Primary Examiner*—B. Dobeck
*Attorney, Agent, or Firm*—Craig & Antonelli

[57] ABSTRACT

In a thyristor chopper circuit used for the control of the rotational speed of an electric motor and provided with a protective system for preventing problems caused by a commutation failure in the chopper circuit, the protective system is provided with means for detecting the occurrence of commutation failure and means for certifying the operative condition or validity of the commutation failure detecting means. The operative condition certifying means is provided with means for supplying the commutation failure detecting means with a checking signal corresponding to a signal which is applied to the commutation failure detecting means upon the occurrence of the commutation failure so that whether the protective system is in a normally operative or valid condition can be certified at any time desired.

11 Claims, 7 Drawing Figures

PROTECTIVE SYSTEM AGAINST COMMUTATION FAILURE IN A CHOPPER CIRCUIT

BACKGROUND OF THE INVENTION

1. FIELD OF THE INVENTION

The present invention relates to a protective system against a commutation failure in a chopper circuit and more particularly to a protective system against a commutation failure in a chopper circuit of an electrically driven vehicle, wherein means is provided for certifying the operative condition or validity of the protective system at any time desired.

2. DESCRIPTION OF THE PRIOR ART

When the thyristor chopper circuit in an electrically driven vehicle (hereafter referred to as EDV) fails in commutating action, an excessive current flows through the electric motor and there might be a danger of the EDV being uncontrollably driven by the excessive current. In order to avoid such a problem there is provided a protective system for preventing problems due to commutation failure. The protective system is adapted to disconnect the load or electric motor circuit from the power source as soon as a commutation failure has taken place. However, if there is a problem in the protective system, the protective system cannot cope with the commutation failure taking place during the movement of the EDV, so that a danger of uncontrollable drive will be caused. It is preferable to certify, before the start or during the travel of the EDV, whether the preventive system is in the properly operative or valid condition or not.

Conventionally, when it was desired to check the operative condition or validity of the protective system, an actual commutation failure was caused during the test of the protective system. This way of testing is, however, very inconvenient since the interval structure, e.g. electric wiring, nust be altered for that purpose.

SUMMARY OF THE INVENTION

An object of the present invention is to eliminate the above-mentioned technical drawbacks in the conventional protection system of electrically driven vehicles.

Another object of the present invention is to provide a protective system against a commutation failure in a chopper circuit, in which system there is provided means for certifying the operative condition or validity of the protective system without causing an actual commutation failure.

The feature of the present invention is in that the protective system comprises means for detecting a commutation failure and means associated with the commutation failure detecting means to supply the commutation failure detecting means with a checking signal corresponding to a signal applied to the commutation failure detecting means upon the occurrence of a commutation failure so that whether the protective system is in a properly operative or valid condition is not can be certified at any time desired without causing an actual commutation failure.

DESCRIPTION OF THE PREFERRED EMBODIMENTS

Figure 1:
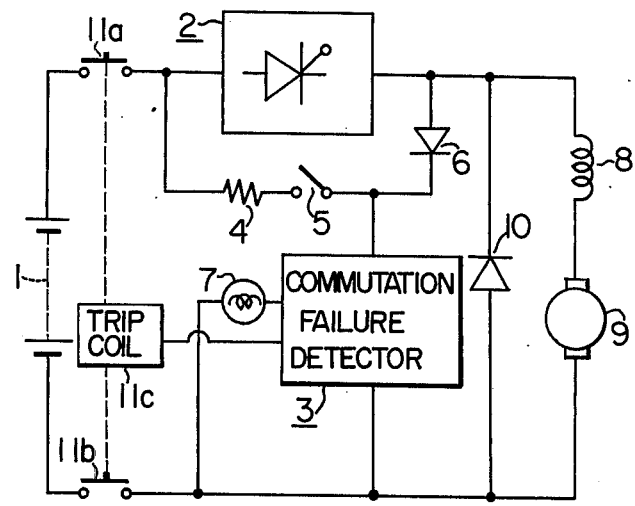
FIG. 1 shows schematically a fundamental circuit configuration of a protective system as a first embodiment of the present invention.

The same reference numerals/characters designate the same circuit components respectively in FIGS. 1 to 7 of the drawings.

In FIG. 1 showing a fundamental circuit of an embodiment of the present invention, a battery 1 serves as a power source and a chopper circuit means 2 supplies a voltage proportional to the duty factor of the chopper circuit to a main circuit containing a field coil 8 and an armature winding 9. The duty factor of the chopper circuit is defined hereinafter as the ratio of the conducting time to the period of one cycle of the chopper circuit operation. A free-wheel diode 10 is connected to shunt the series circuit of the field coil 8 and the armature winding 9. A commutation failure detecting circuit means 3 detects, through a diode 6, a D.C. voltage delivered by the chopper circuit means 2 when it fails to commutate. A trip coil 11c constituting the protective circuit together with the detecting circuit means 3 is actuated when a commutation failure is detected by the detecting circuit means 3 to open contacts 11a and 11b of a breaker inserted in the main circuit and a lamp 7 is provided for indicating a commutation failure.

When it is desired to check the operative condition or validity of the commutation failure detecting circuit means 3 and the trip coil 11c which constitute the protective circuit, it is only necessary to close a switch 5 to supply the commutation failure detecting circuit means 3, through a resistor 4, with a D.C. voltage corresponding to a signal voltage applied from the chopper output to the circuit means 3 when a commutation failure actually takes place. At this time, if the circuit means 3 and the trip coil 11c are in the normally operative condition, the lamp 7 indicates the validity of the protective system. In this case, the current flowing through the resistor 4 is selected to be too small to actuate the trip coil 11c. For example, the current is preferably 50 mA or less in the case of testing the validity and about 1.5 – 2 A in the case where the trip coil is to be actuated. Namely, the resistor 4 and the switch 5 constitute a circuit means for certifying the validity of the protective circuit.

Figure 2:
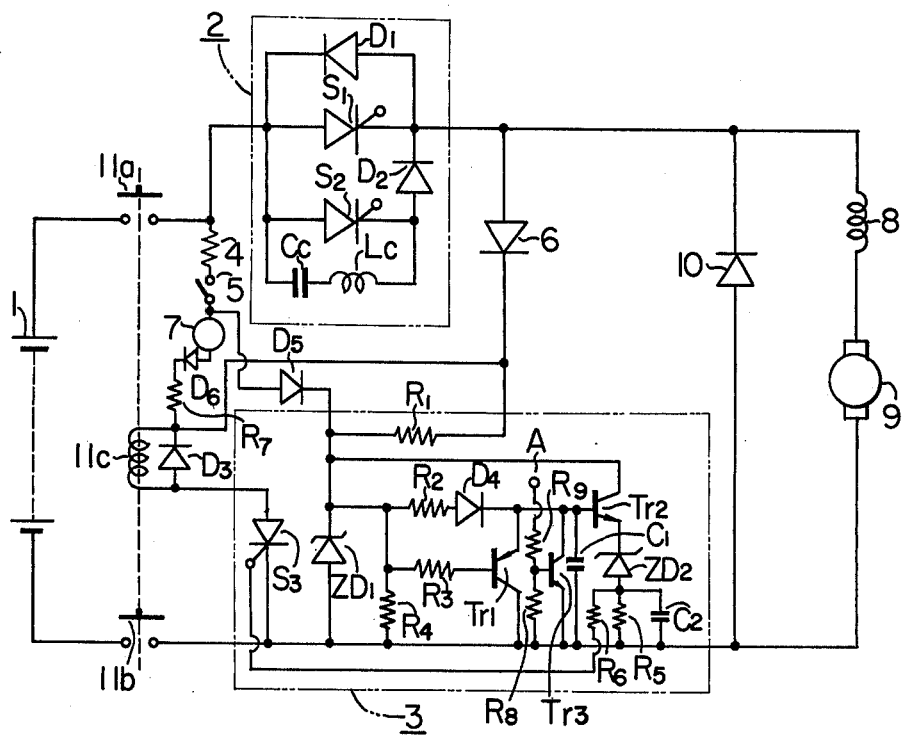
FIG. 2 shows a concrete circuit of a protective system as a second embodiment of the present invention.

FIG. 2 shows concretely the protective system which is schematically shown in FIG. 1. The chopper circuit means 2 is composed of a main thyristor S1, an auxiliary thyristor S2, a commutating capacitor Cc, a commutating reactor Lc, a blocking diode D2 and a bypass diode D1. The travelling speed of the EDV is controlled by changing the duty factor of the chopper circuit means 2.

Now, the operation of the commutation failure detecting circuit means 3 will be described. The output of the chopper circuit means 2 is applied to the detecting circuit means 3 through a diode 6. When the chopper circuit means 2 is conducting, the chopper output is rendered constant by means of a resistor R1 and a zener diode ZD1 and the constant voltage charges a capacitor C1 through a resistor R2 and a diode D4. On the other hand, when the chopper 2 is cut off, the voltage across the zener diode ZD1 vanishes so that the base current associated with a transistor $Tr_1$ flows through resistors $R_3$ and $R_4$ due to the electric charges of the capacitor $C_1$. Consequently, the electric charges stored in the capacitor C1 are released through the transistor $Tr_1$ and the voltage across the capacitor C1 is kept lower than the rated voltage of a zener diode ZD2. If the chopper fails to commutate except when it is at fully opened performance, the chopper output becomes continuous so that the capacitor C1 is continuously charged up. Accordingly, when the voltage across the capacitor C1 exceeds the rated voltage of the zener diode ZD2, a current flows into the gate of a thyristor S3 through a resistor R6 so that the thyristor S3 is renedered on. As a result, a current flows through the trip coil 11c of the protective circuit to render the contacts 11a and 11b of the breaker off to thereby cut off the current through the main circuit. Thus, by cutting off the current through the electric motor (8, 9), the uncontrollable travel of the EDV is prevented. When the EDV is travelling with the chopper fully opened, a positive signal is applied through a resistor R9 to a terminal A so as to render a transistor $Tr_3$ on to continuously discharge the capacitor C1 to thereby stop the operation of the protective system. The above-described operation of the protective system which plays a very important role, must be always checked so as not to drive the EDV into an uncontrollable state.

According to the present invention, the check of the validity of the protection system is performed as follows: In the first place the switch 5 is closed prior to the actuation of the chopper circuit 2 and a D.C. voltage is applied to the commutation failure detecting circuit means 3 through the resistor 4 and a diode D5. Thus, the same D.C. voltage as that produced in the case of commutation failure is applied to the detecting circuit 3 and when the detecting circuit 3 is in a normally operative condition, the thyristor S3 is turned on as in the case when an actual commutation failure has occurred. Consequently, a current from the battery 1 flows through the resistor 4, the switch 5, the lamp 7, the diode D6, the resistor R7, the trip coil 11c and the thyristor S3 so that the display lamp 7 is lit to indicate that the operation of the detecting circuit means 3 is normal. Thus, according to the present invention, the operation of the commutation failure detecting circuit means can be checked by employing only a simple circuit means consisting of resistors and a switch.

In a practical form the switch 5 may be a two-position key switch (not shown) which is conductive at its first position to check the operation of the detecting circuit means and cut off at its second position to start the operation of the chopper.

A resistor R5 and a capacitor C2 is inserted to eliminate the erroneous operation of the thyristor S3 while the diode D3 is for absorbing the surge voltage of the trip coil 11c.

The description of the present invention given above is devoted solely to the commutation failure detecting circuit means of voltage detecting type, but it is a matter of course that the present invention can be applied to the commutation failure detecting circuit means of current detecting type. Such an application will be described below with the aid of FIG. 3.

Figure 3:
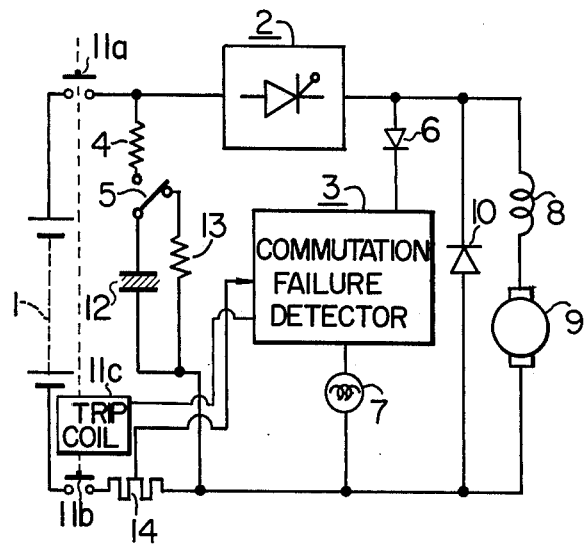
FIG. 3 shows in block diagram a protective system as a thrid embodiment of the present invention.

FIG. 3 shows another embodiment of the present invention. In FIG. 3, for certifying whether the commutation failure detecting circuit means 3 operates properly or not, it is only necessary to change over a switch 5 so that is assumes a state opposite to that shown in FIG. 3. By doing so, the capacitor 12 is charged through a resistor 4 and a charging current flows through a current detector 14 to play the same role as the D.C. current due to an actual commutation failure. A resistor 13 serves as a discharging path for the capacitor 12.

Figure 4:
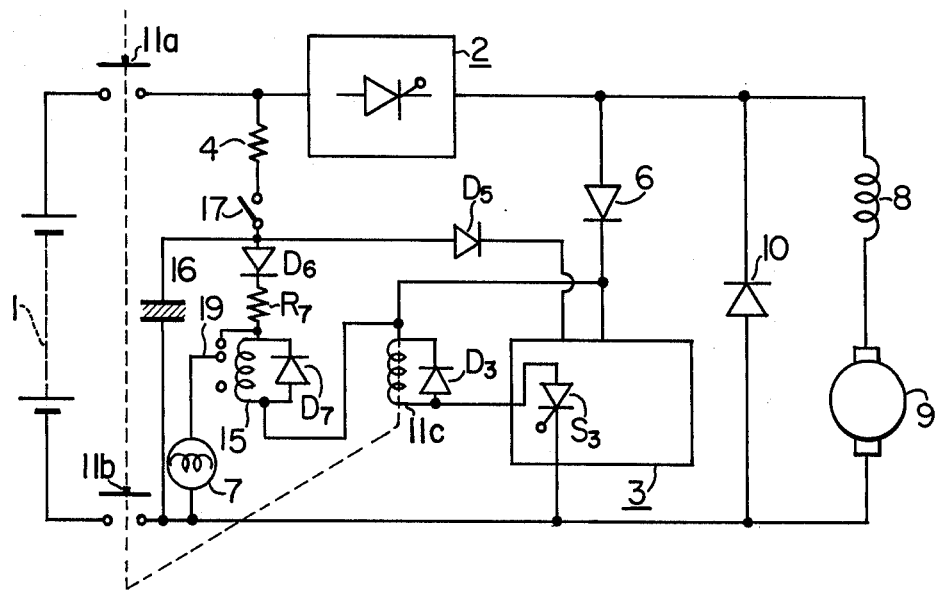
FIG. 4 shows a protective system as a fourth embodiment of the present invention, which is a modification of the circuit shown in FIG. 2.

FIG. 4 shows still another embodiment of the present invention. The difference of this embodiment from that shown in FIG. 2 is that the switch 5 interlocking with the key switch is replaced by a switch 17 operating in gear with an accelerator of the EDV. The switch 17 is closed when the accelerator is depressed.

The operation of the circuit shown in FIG. 4 is as follows:

When the accelerator is depressed, the switch 17 is closed. So, the voltage equivalent to that due to a commutation failure is applied through a resistor 4, the switch 17 and a diode D5 to a commutation failure detecting circuit means 3 so that a thyristor S3 (see FIG. 2) of the circuit means 3 is rendered on. Just after the turning-on of the thyristor S3, a current flows through a diode D6, a resistor R7, an exciting coil of a relay 15 and a trip coil 11c, so that the relay is energized to open a switch 19 with the result that the lamp 7 remains unlit. If there is trouble in the trip coil 11c or the commutation failure detecting circuit means 3 of the protective circuit, the relay 15 is not energized and therefore the switch 19 remains closed so that the lamp 7 is lit to indicate the abnormal condition. A capacitor 16 is used to retard by a certain time the generation of the voltage equivalent to the signal voltage produced due to an actual commutation failure.

In the embodiment shown in FIGS. 2 and 3 the operation of the commutation failure detecting circuit means can be checked only at the start of the EDV while in the embodiment shown in FIG. 4 an abnormal condition, if any, of the preventive circuit including the commutation failure detecting circuit means and the trip coil, can be checked each time the accelerator is released. That is, in the latter embodiment whether there is an abnormal condition or not can be checked during the movement as well as at the start of the EDV. The feature that the switch 5 is interlocked with the accelerator and the feature that the commutation failure detecting circuit and the trip circuit are connected in series with each other, may be independently combined with other embodiments.

Figure 5:
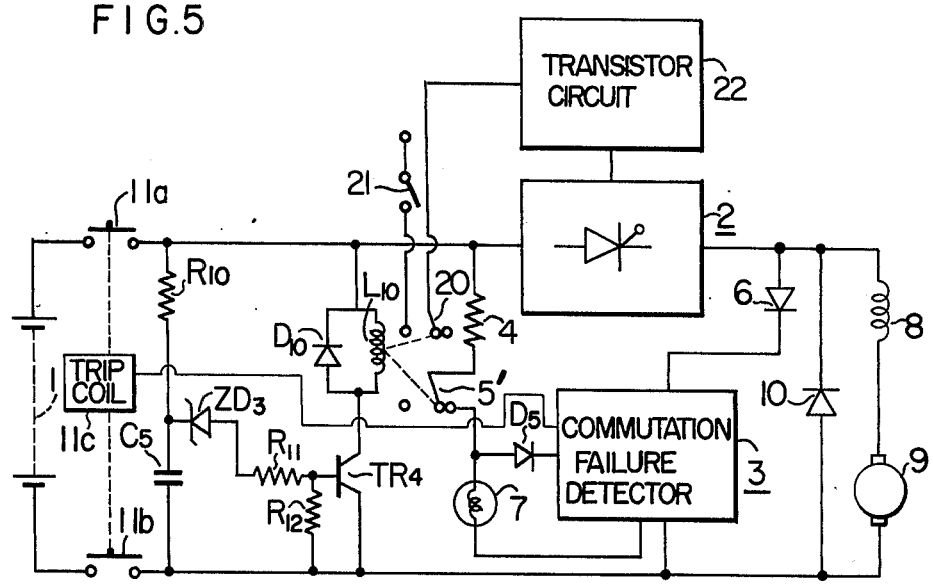
FIGS. 5 to 7 also show protective systems as fifth to seventh embodiments of the present invention.

FIG. 5 shows another embodiment of the present invention, in which a lamp 7 is lit for a short period of time after contacts 11a and 11b of a breaker are closed in the case where a commutation failure detecting circuit means 3 is operative normally. In FIG. 5, a switch 5' is a normally closed one while a switch 20 between a key switch 21 and a transistor circuit 22 is a normally open one. When the contacts 11a and 11b are closed at the start of the EDV, the lamp 7 is lit if the commutation failure detecting circuit means 3 is operating properly. After a certain lapse of time, the voltage across a capacitor C5 due to the stored charges reaches such a level as to cause a zener diode ZD3 to conduct so that a transistor TR4 is rendered on. Consequently, a relay L10 is actuated, the switch 5' is opened and the switch 20 is closed. As a result, the lamp 7 is deenergized and the EDV can be started if the key switch 21 is closed.

Figure 6:
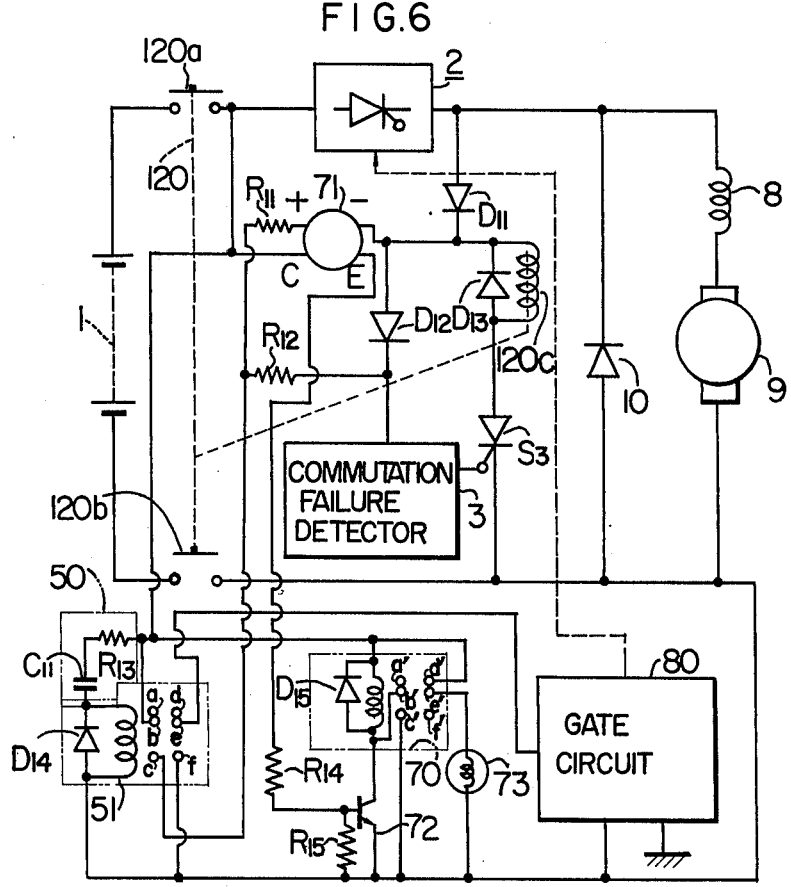

FIG. 6 shows another embodiment of the present invention. In FIG. 6, the contacts 120a and 120b of a breaker 120 are selectively open and closed by means of a trip coil 120c. The trip coil 120c is shunted by a diode $D_3$ and one end of the coil 120c is connected through a diode $D_1$ with the output side of a chopper 2 while the other end is connected through a thyristor $S_3$ with the negative electrode of a power source. When the chopper 2 fails to commutate, the output voltage of the chopper is approximately equal to the voltage of the power source so that by applying the output voltage of the chopper through the diodes $D_1$ and $D_2$ to a commutation failure detecting circuit means 3 the thyristor $S_3$ is rendered conductive. Then, a current flows through the trip coil 120c to open the contacts 120a and 120b of the breaker.

After the contacts 120a and 120b of the breaker 120 have been closed, the commutation failure detecting circuit means 3 is applied with a voltage from the contact 120a through the contacts b and c of a first relay 51 and a resistor R2. In a like manner, a voltage is applied through the resistor $R_1$ to the primry terminal of a photocoupler 71. The secondary output terminal E of the photocoupler 71 is connected through a resistor $R_4$ with the base of a transistor 72. The collector of the transistor 72 is connected with a second relay 70 which selectively opens and closes, through its contacts d, e and f, the power circuit of a warning lamp 73.

The check of the operation of the commutation failure detecting circuit means 3 is performed as follows: When the breaker 120 is closed, the warning lamp 73 is lit and simultaneously the first relay 51 is kept energized for a certain period determined by the time constant $C_1R_3$ of a time-limit circuit 50, with its contacts b and c, and contacts e and f closed respectively. A gate circuit 80 for controlling the conduction of the chopper circuit 2 is connected through a key switch (not shown) with an auxiliary power source (not shown), which supplies the gate circuit 80 with a control voltage. In response to the closure of the contacts e and f of the first relay 51, the application of the control voltage to the gate circuit 80 is interruped temporarily. If the gate circuit is operated to cause a current to flow through the chopper, the trip coil 120c is energized so that the contacts 120a and 120b will be opened. And a voltage almost equivalent to that due to commutation failure is applied through the contacts b and c of the first relay 51 and the resistor $R_2$, to the commutation failure detecting circuit means 3. If in this case the detecting circuit means is operating properly, the thyristor $S_1$ is rendered on. Accordingly, a current flows through the resistor $R_1$, the primary circuit of the photocoupler 71, the trip coil 120c and the thyristor $S_1$ so that the photocoupler 71 is turned on (the value of the current in this case is predetermined to be smaller than the energizing current for the trip coil 120c). When the photocoupler 71 is turned on, a current flows through its collector C, emitter E and the resistor $R_4$ into the base of the transistor 72 so that the transistor 72 is turned on to energize the second relay 70. Consequently, the contacts a' and b' and the contacts d' and e' of the second relay 70 are opened to deenergize the warning lamp 73. Once the second relay 70 is energized, it is not reset until the breaker 120 is again actuated by the first relay 51, since the self-hold circuit including the contacts b' and c' of the relay 70 maintains the energized condition of the second relay 70. Thus, the lamp 73 continues to be unlit. The gate circuit 80 is restored to its normal state when the first relay 51 is reset.

If there is a problem in the commutation failure detecting circuit means 3, the operation is opposite to that mentioned above, that is, even if the breaker 120 is closed, the detecting circuit means 3 does not operate so that the thyristor $S_3$ is not energized. The photocoupler 71 remains in the nonconductive state, the transistor 72 is not turned on, the second relay 70 is not energized and therefore the warning lamp 73 remains lit, indicating the existence of the abnormal condition.

Namely, when the warning lamp is lit for a short period and then deenergized after the breaker has been closed, the commutation failure detecting circuit means is at its normal operation, but the detecting circuit means is in the abnormal condition when the lamp is kept energized. If the lamp is not lit at all, the filament of the lamp or the associated electrical wiring should be checked. Since the breaker is closed in advance of the start of the EDV, the operation of the commutation failure detecting circuit means 3 can be automatically checked before each start. Alternatively, another condition for the check of the operation may be employed. Namely, the operation of the commutation failure circuit means is checked when both the breaker and the key switch are closed.

Figure 7:
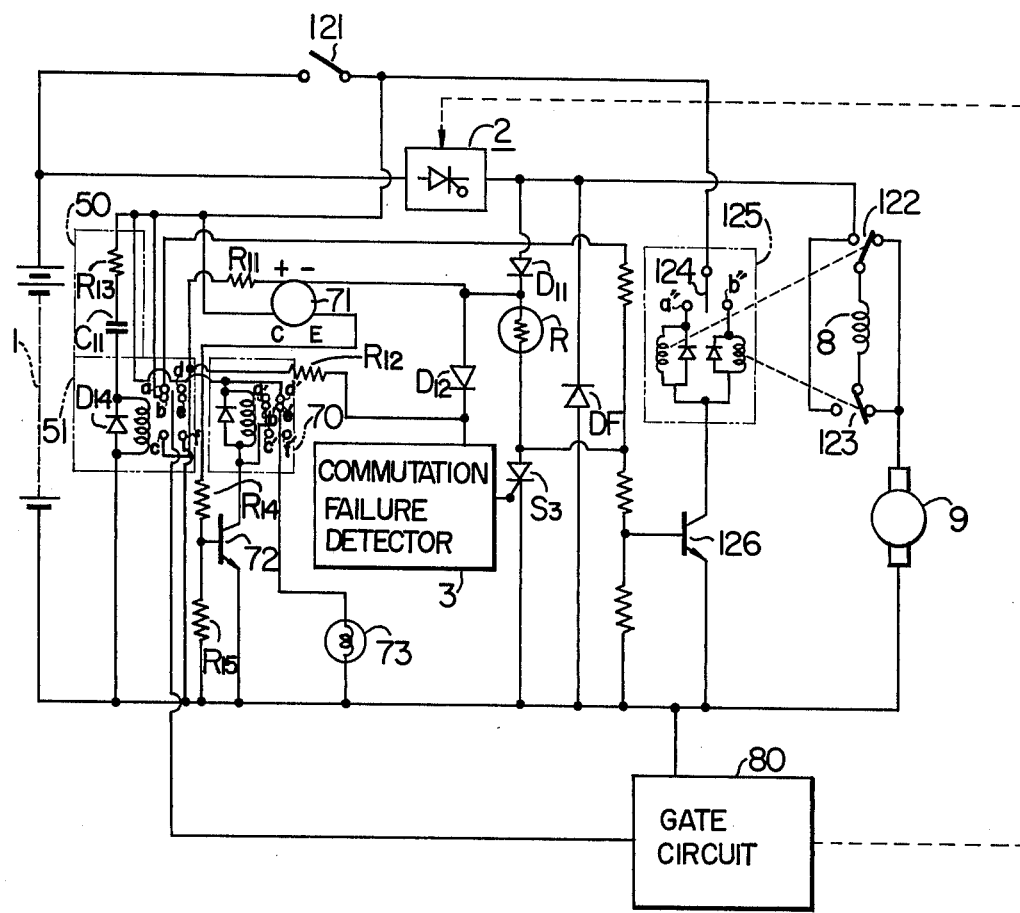

FIG. 7 shows another embodiment of the present invention, as applied to such an EDV as a battery-powered fork lift in which forward and reverse travel change-over switches 122 and 123 are provided as main switches in place of a circuit breaker. The series field coil 8 of the motor 9 may be connected in a change-over manner by the forward and the backward travelling switches 122 and 123 so that the motor 9 can be rotated in the forward or reverse direction. The change-over switches 122 and 123 are changed over in gear with a forward-backward change-over relay 125. The forward-backward change-over relay 125 has a change-over switch 124, the contacts a'' and b'' of which are alternatively selected to change over the switch 122 and 123 respectively. A transistor 126 is connected in series with the relay 125 and the base of the transistor 126 is connected with the anode of a thyristor $S_3$ which is controlled by a commutation failure detecting circuit means 3. A first relay 51, a second relay 70, a photocoupler 71 and a gate circuit 80 in FIG. 7 are the same as those shown in FIG. 6. When the key switch 21 is closed, a warning lamp 73 is lit and the first relay 51 is kept energized for a certain period to apply a voltage to the commutation failure detecting circuit means 3. As a result, the photocoupler 71 is turned on when the detecting circuit means 3 is at its normal operation, so that the transistor 72 is turned on, the second relay 70 is energized, the warning lamp 73 is extinguished, and the operation of the gate circuit 80 is interrupted temporarily.

In the above described embodiments, the warning lamp is kept lit when there is an abnormal condition in the commutation failure detecting circuit means 3. However, other means may be used for the indication of the abnormality. Moreover, in order to increase the safety of the EDV, the EDV may be stopped when the abnormality is detected. For example, the gate circuit 80 may be so designed as to be closed by the output of the second relay 70 for an abnormal output as well as for check. Further, a control means such as a switch provided on the body of the EDV may be utilized as a means for checking the operation of the commutation failure detecting circuit means 3, in the different manner which has been mentioned above.

We claim:

1. A protective system against a commutation failure in a chopper circuit provided for controlling the speed of an electric motor, said system comprising:

protective circuit means including means associated with the chopper circuit for detecting a commutation failure in said chopper circuit and means responsive to said commutation failure detecting means for breaking the main circuit including said electric motor from a power supply when a commutation failure takes place in said chopper circuit; and means associated with said protective circuit means for certifying the validity of said protective circuit means in such a manner that said certifying means applies a checking signal to said commutation failure detecting means when the check of the validity of said protective circuit means is required at any time desired, said checking signal being selected to correspond to a signal applied from said chopper circuit to said commutation failure detecting means when an actual commutation failure takes place in said chopper circuit.

2. A protective system according to claim 1, said commutation failure detecting means being adapted to detect the occurrence of a commutation failure in said chopper circuit in response to the output of said chopper circuit; said main circuit breaking means including a trip coil for breaking said main circuit in response to the detection of a commutation failure by said commutation failure detecting means; said validity certifying means including a lamp associated with said protective circuit means and adapted to be lit at the same time when said trip coil is actuated and checking signal applying means including switch means and connected between said power supply and said protective circuit means for applying a current as said checking signal to said protective circuit means through said switch means when said switch means is actuated, said current being so selected that it is sufficient to light said lamp but it is not sufficient to actuate said trip coil.

3. A protective system according to claim 2, in which said switch means is associated with an accelerator for the speed of said electric motor and the lighting of said lamp is controlled by relay means which is connected in series with said switch means, said commutation failure detecting means and said trip coil.

4. A protective system against a commutation failure in a chopper circuit provided for controlling the speed of an electric motor, said system comprising:

protective circuit means including means associated with said chopper circuit for detecting a commutation failure in said chopper circuit and circuit breaker means responsive to said commutation failure detecting means for cutting off said motor from a power supply;

means for certifying the validity of said protective circuit means, said certifying means including means for applying a checking signal in response to the closure of said circuit breaker means to said commutation failure detecting means for a predetermined period of time which is determined by time limit circuit means, said checking signal being selected to correspond to a signal applied to said commutation failure detecting means when an actual commutation failure takes place; and means responsive to the output of said commutation failure detecting means when said checking signal is applied thereto for indicating the validity of said protective circuit means.

5. A protective system according to claim 4, in which said checking means is so arranged that said certifying means is actuated when both said circuit breaking means and a key switch connected between a gate circuit for controlling said chopper circuit and an auxiliary power supply are closed to apply said checking signal to said commutation failure detecting means.

6. A protective system according to claim 1, wherein said electric motor serves for driving an electrically driven vehicle and said certifying means applies said checking signal during a predetermined period of time automatically in response to a specific operation of said vehicle.

7. A protective system according to claim 1, wherein said certifying means applies said checking signal in bypassing relation to said chopper circuit.

8. A protective system according to claim 2, wherein said electric motor serves for driving an electrically driven vehicle, and said switch means is turned on when an accelerator for the speed of said electric motor is placed in its deactuated position, and the lighting of said lamp is controlled by relay means which is connected in series with said switch means, said commutation failure detecting means and said trip coil.

9. A protective system according to claim 2, wherein said switch means is a two-position key switch, said switch being conductive at a first position for checking the operation of said commutation failure detecting means and being cut off at a second position for starting the operation of said chopper circuit.

10. A protective system according to claim 4, wherein said electric motor serves for driving an electrically driven vehicle and said means for applying said checking signal is responsive to the closure of said circuit breaker means at the starting period of said vehicle.

11. A protective system according to claim 4, wherein said means for applying said checking signal applies said checking signal to said commutation failure detecting means in bypassing relation to said chopper circuit.

* * * * *